No. 757,631. Patented April 19, 1904.

UNITED STATES PATENT OFFICE.

CLARENCE D. NIRDLINGER, OF ST. LOUIS, MISSOURI.

VEHICLE-TIRE FILLER.

SPECIFICATION forming part of Letters Patent No. 757,631, dated April 19, 1904.

Application filed August 10, 1903. Serial No. 169,025. (No specimens.)

*To all whom it may concern:*

Be it known that I, CLARENCE D. NIRDLINGER, a citizen of the United States, residing at St. Louis, State of Missouri, have invented certain new and useful Improvements in Vehicle-Tire Fillers, of which the following is a specification.

This invention relates to a novel composition of matter adapted to serve as a filling for a tire having an exterior sheathing, the object being to provide a tire having the advantages of an ordinary pneumatic tire which shall be free from the disadvantages incident to articles of that sort.

I produce a tire which has an exterior tube, preferably of rubber, and an interior chamber initially empty, but which when the tire is completed is filled with a yielding elastic filler of such nature and introduced in such way that the filling mass and the exterior tube become practically incorporated one with the other and inseparable one from the other.

The ingredients which I use to form a mass of the filling material are glucose, glue, glycerin, tannin, formaldehyde, and water. The ultimately resulting mass contains these in substantially the following proportions—to wit, one-third of a pound of glucose, one-fourth of a pound of glue, somewhat less than one-half—say five-twelfths—of a pound of glycerin, one-fortieth of an ounce of tannin, one-fifteenth of an ounce of formaldehyde, and one-third of an ounce of water. In ten pounds of the compound are put approximately one ounce of chrome-alum. I do not mean that exactly these relative proportions are essential to the invention, for there can be more or less modification in that respect without departing from the characteristic features, nor do I mean that all of these substances are brought together at once, for, as it will be seen below, the ultimate and complete compound is produced more or less gradually.

The following will furnish to one acquainted with such matters an understanding of one course of procedure which can be followed: A mass of liquid glue is provided by mixing one pound of hard glue with one pound of water in such quantities as are desirable, the mixture preferably being allowed to rest for half a day. A mass of glycerin is placed in a tank and heated for about half an hour, and then glue, such as above provided, is added in the proportion herein set forth of a quarter of a pound of glue to five-twelfths of a pound of glycerin, and after they are brought together they are slowly stirred for half an hour. Glucose in a liquid state is then added, about one-third of a pound to a quarter of a pound of the glue, and this mixture is slowly stirred for a brief period of a few minutes. Then tannin is introduced in approximately the proportions indicated and the stirring is continued for a further short period. A solution of formaldehyde and water (one part of the former and five of the latter) is then added to the mixture, after which the stirring action is continued for a sufficient time—say one hour—and, as aforesaid, by preference, I combine with the above compound a quantity of chrome-alum, approximately one ounce to ten pounds of the compound. The action of the formaldehyde in the composition itself is not only antiseptic, but leather-forming.

The rubber sheathing or tube of the tire should first be rinsed or flushed with a solution of formaldehyde, this preventing the starting of fermentation in any of the ingredients of the filler, the formaldehyde acting here in relation to the rubber sheathing, as it does in the filling mixture, as a destroyer of the germs or the like which cause fermentation and insures that the filling mass shall become thoroughly incorporated with the interior part of the rubber and that the union of the two bodies shall remain firm, so that there will not occur that result which has made tire-fillers of earlier sorts inoperative—namely, the loosening and separating of the filler from the rubber sheath.

What I claim is—

1. The herein-described composition of matter as a filler for tires having mixed together glue, glycerin, saccharine matter and formaldehyde in substantially the proportions and manner set forth.

2. The herein-described composition of matter as a filler for vehicle-tires having mixed together glucose, glue, glycerin and formaldehyde in substantially the proportions and in the manner set forth.

3. The herein-described composition of matter as a filler for vehicle-tires, it having glucose, glue, glycerin, tannin and formaldehyde in substantially the proportions and manner set forth.

4. The herein-described composition of matter as a filler for vehicle-tires, having mixed together glue, glucose, glycerin, saccharine matter, formaldehyde, and chrome-alum in substantially the proportions and manner set forth.

In testimony whereof I affix my signature in presence of two witnesses.

CLARENCE D. NIRDLINGER.

Witnesses:
W. R. MORGAN,
A. G. HARDING.